April 19, 1966     L. M. BALLAMY     3,246,782
MOTOR VEHICLES
Filed Nov. 3, 1964     2 Sheets-Sheet 1
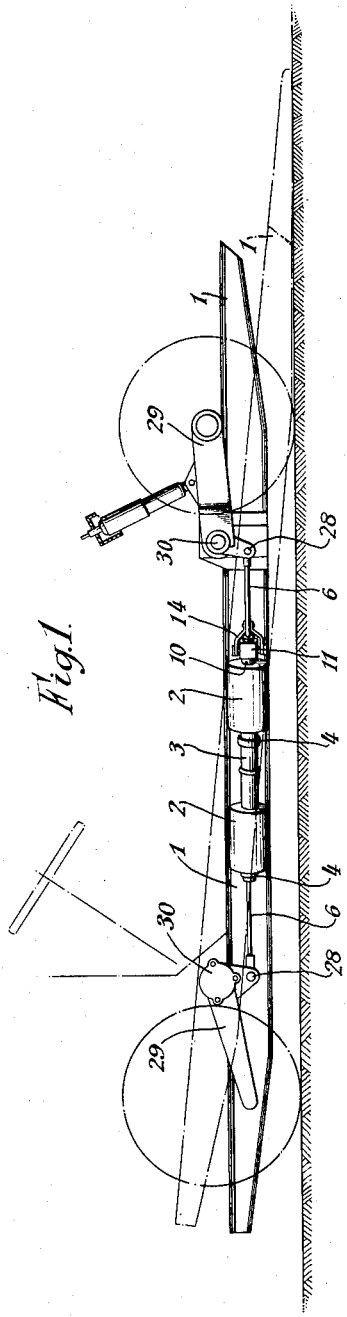
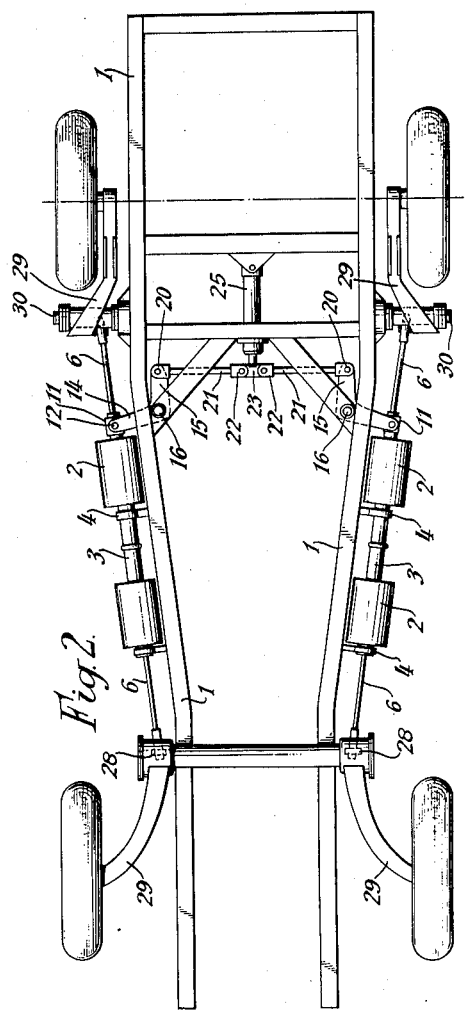
INVENTOR
LESLIE MARK BALLAMY
BY
OSTROLENK, FABER, GERB & SOFFEN
ATTORNEYS

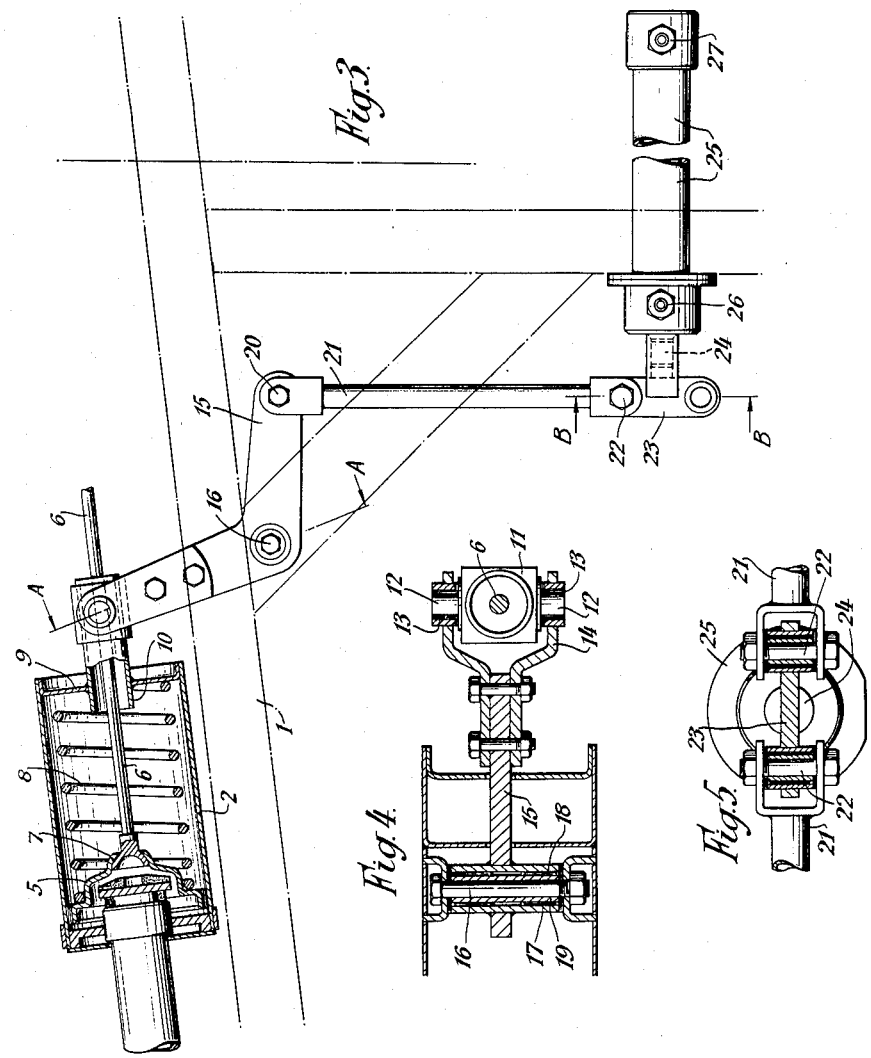

United States Patent Office 3,246,782
Patented Apr. 19, 1966

3,246,782
MOTOR VEHICLES
Leslie Mark Ballamy, Guildford, England, assignor to National Fund for Research into Poliomyelitis and Other Crippling Diseases, London, England, a company of limited liability
Filed Nov. 3, 1964, Ser. No. 408,480
5 Claims. (Cl. 214—506)

This invention relates to motor road vehicles, the phrase "motor road vehicles" being intended to cover road vehicles which are propelled by internal combustion engines or road vehicles of the kind propelled by electric motors.

The chief object of this invention is to evolve a construction of motor road vehicle which will be suitable for driving by persons who have lost one or both legs or have lost the use or partial use of their legs and consequently are unable unassisted to reach the driving seat.

The invention is, however, applicable for use generally to assist in the easy loading of a motor vehicle.

A motor road vehicle in accordance with the present invention is enterable from the rear and includes means whereby the floor of the vehicle may be inclined when required into a position in which the floor at the rear is in contact with or in close vicinity to the ground. It is preferred to so tilt the floor of the vehicle that the rearward end will be lowered and the forward end raised such an arrangement ensuring that the rear edge of the floor will contact or substantially contact the ground without risk of any downwardly depending part fouling the ground surface and being accidentally damaged. Such an arrangement will enable a person in a wheeled chair to enter the vehicle from the rear and reach a position in which the person still in the wheelchair can manipulate the steering wheel and suitable hand operable driving controls, means being provided for locking the wheelchair in such position and means for returning the vehicle to its normal driving position in which the floor is horizontal or substantially horizontal.

It will be appreciated that the usual driver's seat will not be provided, the wheelchair occupying the position taken by the driver's seat. It is preferred to employ a wheelchair of special construction wherein the effective height of the chair can be reduced by suitable means under the control of the user, so that the user can, either before entry into the vehicle or subsequently, adjust the height of the chair to suit his own requirements and enable him to operate the various driving controls easily.

It is proposed in carrying out the invention to drive the front wheels of the vehicle, thereby enabling a vehicle to be produced having a flat floor free from protuberances, and due to the absence of a back axle and differential enabling the rear of the vehicle to be lowered to, or almost to ground level.

Although any suitable form of suspension may be employed it is preferred to employ a system of suspension wherein the springs or other resilient components for the front and rear wheels are situated centrally or substantially centrally of the length of the vehicle and take the form of self contained spring boxes or suspension units connected with the front and rear axles by a system of levers and rods.

Referring to the accompanying drawings:
FIGURE 1 is a side elevation of a motor vehicle chassis incorporating the present invention;
FIGURE 2 is a plan view;
FIGURE 3 is a sectional plan view showing further details of construction;
FIGURE 4 is a section on the line A—A in FIGURE 3; and
FIGURE 5 is a section on the line B—B in FIGURE 3.

In the construction illustrated the vehicle chassis 1 carries on each side a pair of spring boxes or suspension units 2 arranged in spaced relationship but rigidly connected by connecting member 3. The spring boxes are permitted a limited amount of endwise sliding movement, the boxes being mounted in guides 4 carried by the chassis frame members.

Each box as shown clearly in FIGURE 3 contains a piston 5 coupled to a piston rod 6 by means of a universal ball type joint 7, a coil spring 8 being interposed between the piston and an end cover plate 9 of the box, the cover plate carrying an extension tube 10 through which the piston rod 6 emerges from the box.

The extension tube 10 is fitted with a collar 11 carrying trunnions 12 mounted in bearings 13 carried by the bifurcated end 14 of a bell-crank lever 15 pivotally mounted on a fulcrum pin or bolt 16 carried by the chassis frame or a bracket or the like associated therewith, the lever 15 being welded to a tube 17 revolvable about bearings 18 interposed between the tube 17 and a tubular distance piece 19 enclosing the bolt.

The opposite end of the lever 15 is connected by means of a fulcrum pin 20 with the bifurcated end of a link 21. The opposite bifurcated end of link 21 is connected by means of a fulcrum pin 22 to a bracket 23 carried by the extremity of a hydraulic ram 24 slidably mounted in a cylinder 25 having connections 26 and 27 for the supply of hydraulic fluid under pressure.

The piston-rods 6 are connected at 28 to bell crank levers 29 pivotally mounted on the chassis frame at 30 and carrying the front and rear wheel axles.

It will be appreciated therefore that if hydraulic fluid is supplied to the ram under pressure by way of connection 27 to move the ram and its connected parts to the dotted line position, all four spring boxes will be moved bodily rearwardly of the vehicle, thus relieving tension in the rear piston-rods 6 and applying increased tension to the forwardly positioned piston-rods, this having the effect of raising the front end of the chassis frame and lowering the rear end into or substantially into contact with the ground.

It will be appreciated that to return the chassis to its normal position, hydraulic fluid at the back of the ram will be allowed to return to a storage tank via connection 27, whilst fluid under pressure will enter the cylinder through connection 26 thus forcing the ram back.

The hydraulic fluid will be supplied from the storage tank, the requisite pressure being built up by an engine driven or electrically driven pump, the flow and return of the hydraulic fluid being controlled by solenoid operated valves controlled by electric switches disposed at points within reach of the patient whether or not he is inside or outside the vehicle.

Instead of using a hydraulic fluid and a ram, an electric actuator or servo-motor may be employed.

It will be appreciated that by raising and lowering the front and rear of the chassis the clearance between the rear wheel arches or mud wings and the wheels may be less than would be required if the front end of the vehicle floor or chassis remained at a constant height above the ground.

A control switch or switches would normally be provided on the outside of the vehicle for example at the rear end which could be easily reached by the patient in his chair and which when operated would cause the floor or chassis to tilt rearwardly or to return the floor to its normal position. The same switch or switches could also cause the rear door or doors to open or shut, the preferred vehicle being of the estate or station wagon type. The opening and closing of the doors may be controlled by the hydraulic ram or electric operating gear.

Further switches would be provided in the interior of the vehicle which could be operated by the patient when in the driving position to bring about tilting or the return of the floor or chassis to its normal horizontal position.

The means provided in the vehicle for locking the wheelchair in the driving position may take any suitable form but for example may comprise sets of claws which as a result of lowering movement of the wheelchair will be cammed into a position in which the claws embrace the chair frame and thus hold the chair against fore and aft movement, release of the claws being brought about by raising the chair to its normal height.

Any suitable hand operated control means may be provided for actuation of the brakes and accelerator and if necessary the gears and clutch.

Alternative manual means of operating the vehicle tilting mechanism may be provided for use in case of power failure.

Whilst the vehicle herein particularly described is for use as an invalid car, the mechanism for tilting may be applied to vehicles used for other purposes such as ambulances or commercial vehicles.

I claim:
1. In combination:
a motor vehicle chassis;
first and second suspension units slidably mounted on said chassis, said first and second supension units including means for providing spring suspension for a front and rear wheel, respectively; and
means connected to said chassis and said first and second suspension units for moving said suspenion units rearwardly relative to said chassis to tilt the chassis and thereby raise the chassis at the front and lower the chassis at the rear into substantial contact with the ground.

2. In combination:
a motor vehicle chassis;
first and second suspension units, each unit including a chamber slidably mounted on said chassis, and piston means slidable within said chamber and linked to a wheel to provide suspension thereof; and
means connected to said chassis and said first and second chambers, for moving said chambers rearwardly relative to said chassis to tilt the chassis and thereby raise the chassis at the front and lower the chassis at the rear into substantial contact with the ground.

3. In combination:
a motor vehicle chassis;
first and second suspension units for suspending a front and rear wheel, respectively, with respect to said chassis, each unit including a chamber slidably mounted on said chassis and piston means linked to its respective wheel at one end thereof and slidably movable with said chamber at its other end thereof; and
means connected to said chassis and said first and second chambers, for moving said chambers rearwardly relative to said chassis to tilt the chassis and thereby raise the chassis at the front and lower the chassis at the rear into substantial contact with the ground.

4. In combination:
a motor vehicle chassis;
first and second suspension units located substantially midway of the length of said chassis for suspending a front and rear wheel, respectively, with respect to said chassis, each unit including a chamber slidably mounted on said chassis, and piston means linked to a respective wheel at one end thereof and slidably movable against the force of biasing means within said chamber at its other end thereof; and
hydraulic means connected to said chassis and said first and second chambers, for moving said chambers rearwardly relative to said chassis to tilt the chassis and thereby raise the chassis at the front and lower the chassis at the rear into substantial contact with the ground.

5. In combination:
a motor vehicle chassis having first and second bell-crank levers pivotally secured thereto at opposite ends thereof;
a front and rear wheel rotatably mounted on one end of said first and second bell-crank levers, respectively;
first and second suspension units for suspending said front and rear wheels, respectively, with respect to said chassis, said suspension units each including a chamber slidably mounted on said chassis and piston means connected at a first end thereof to a second end of its respective bell-crank lever and slidably movable within said chamber at its other end thereof; and
means connected to said chassis and said first and second chambers for moving said chambers rearwardly relative to said chassis to allow said bell-crank levers to rotate in opposite directions thereby raising the chassis at the front and lowering the chassis at the rear into substantial contact with the ground.

References Cited by the Examiner

UNITED STATES PATENTS

| | | | |
|---|---|---|---|
| 2,462,868 | 3/1949 | Ives | 214—505 |
| 2,818,187 | 12/1957 | Cooley | 214—505 |
| 2,936,919 | 5/1960 | Bowman | 214—505 |
| 3,071,267 | 1/1963 | Bunch | 214—505 |

FOREIGN PATENTS 308,170　9/1955　Switzerland.

GERALD M. FORLENZA, *Primary Examiner.*

HUGO O. SCHULZ, *Examiner.*

A. J. MAKAY, *Assistant Examiner.*